Sept. 17, 1968

D. M. GREY 3,401,810

BALE WAGON

Filed May 9, 1966

INVENTOR.
DONALD M. GREY

BY Donald D. Schaper

ATTORNEY

Sept. 17, 1968

D. M. GREY 3,401,810

BALE WAGON

Filed May 9, 1966

INVENTOR.
DONALD M. GREY

BY Donald D. Shaper

ATTORNEY

Sept. 17, 1968

D. M. GREY 3,401,810

BALE WAGON

Filed May 9, 1966

INVENTOR.
DONALD M. GREY

BY Donald D. Schaper

ATTORNEY

Sept. 17, 1968     D. M. GREY     3,401,810
BALE WAGON
Filed May 9, 1966     7 Sheets-Sheet 7
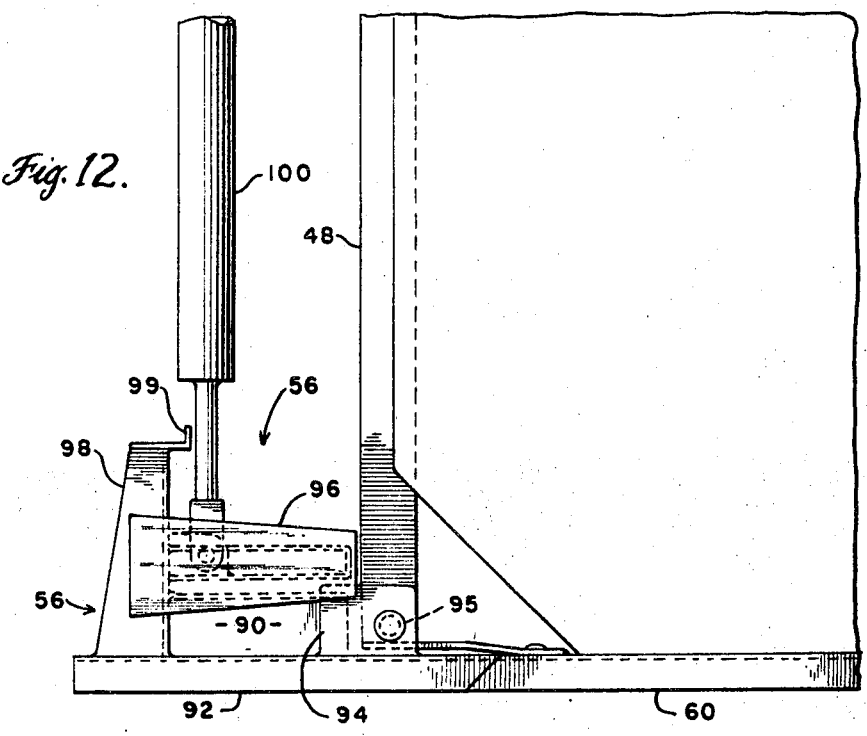
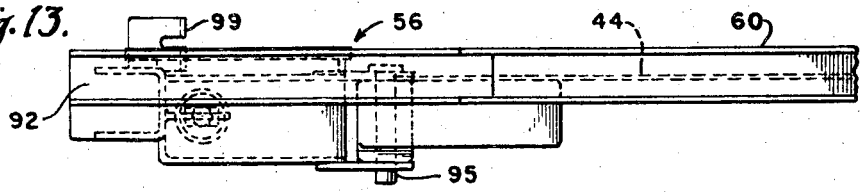
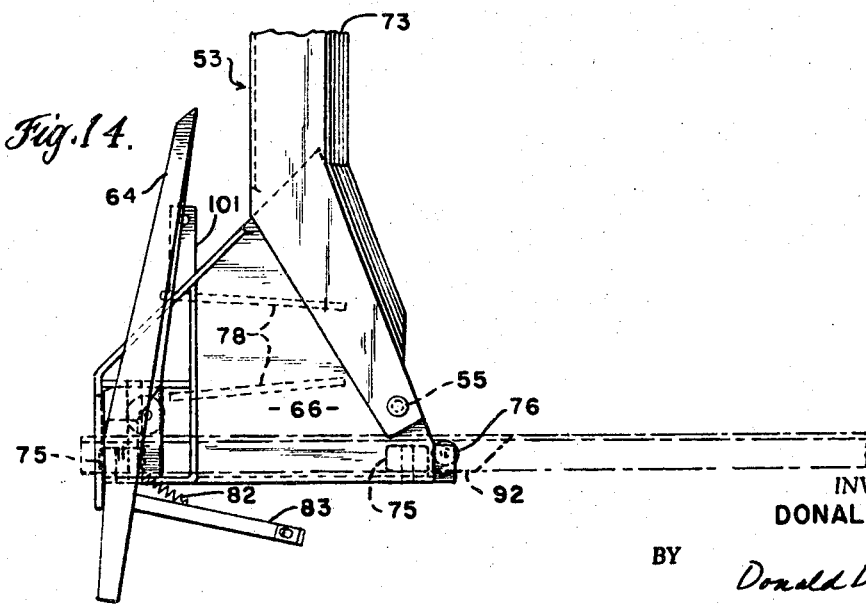
INVENTOR.
DONALD M. GREY
BY
Donald D. Schaper
ATTORNEY

United States Patent Office 3,401,810
Patented Sept. 17, 1968

3,401,810
BALE WAGON
Donald M. Grey, Fresno, Calif., assignor to Sperry Rand Corporation, New Holland, Pa., a corporation of Delaware
Filed May 9, 1966, Ser. No. 548,658
12 Claims. (Cl. 214—6)

ABSTRACT OF THE DISCLOSURE

The invention is directed to a bale wagon which will vertically stack bales on the wagon, discharge the bales in stack form and will retrieve the stack of bales.

---

This invention relates to bale wagons, and more particularly, to a vehicle intended to handle baled products such as baled hay.

In one known type of bale wagon, bales are loaded from the ground onto a transversely extending receiving bed at the forward end of the wagon. Bales from the receiving bed are deposited two at a time on a second bed, known as the transfer bed, where the bales are accumulated to form a layer of approximately eight bales. The loaded transfer bed is then pivoted to a vertical position to deposit the layer of bales in a tier on a third bed, called the load-carrying bed. Successive bale tiers are placed on the load-carrying bed until it is filled. When it is desired to unload the load-carrying bed, it is first tilted to a vertical position. Push shoes on the bale wagon then serve to separate the wagon from the load of bales, and the bales are deposited in a composite stack on the ground. A bale wagon of this type is shown in the U.S. patent to Grey, No. 2,848,127, issued Aug. 19, 1958.

It is common, in a field operation employing the bale wagon described above, to deposit the wagon loads of bales in abutting side-by-side stacks at a central location in the hay field. When the bales are needed by the farmer, they are normally hauled from the field stack by some type of bale stack retriever mounted on a truck chassis. The main disadvantage of an operation using an automatic bale wagon and a stack retriever is that two expensive vehicles must be used to get the bales to their final destination. Further, neither of the vehicles can be practically utilized in other farming operations.

Accordingly, one object of this invention is to provide a bale wagon of the type described with means for forming a stack of bales on the wagon and for picking up a stack of bales from the ground and transporting them to a desired location.

Another object of this invention is to provide, in a bale wagon of the type described, a transfer bed which is adapted to grippingly engage the top of a vertical stack of bales.

Another object of this invention is to provide holding means on a bale wagon for engaging and lifting a vertical stack of bales.

A further object of this invention is to provide means in a bale wagon which can be employed for supporting a bale tier while the wagon is being loaded and which can be pivoted out of engagement with the bales when it is desired to unload the bale wagon.

A still further object of this invention is to provide means in a bale wagon of the type described for unloading the wagon, without the necessity of push shoes to separate the wagon from the load.

Other objects of this invention will be apparent hereinafter from the specification and from the recital in the appended claims.

In the drawings:

FIG. 12 is a fragmentary plan view of the load-carrying bed and showing a pivotal carrier unit for the tine arm unit;

FIG. 13 is an edge view of FIG. 12; and

FIG. 14 is a fragmentary plan view of a tine arm unit.

Figure 7:
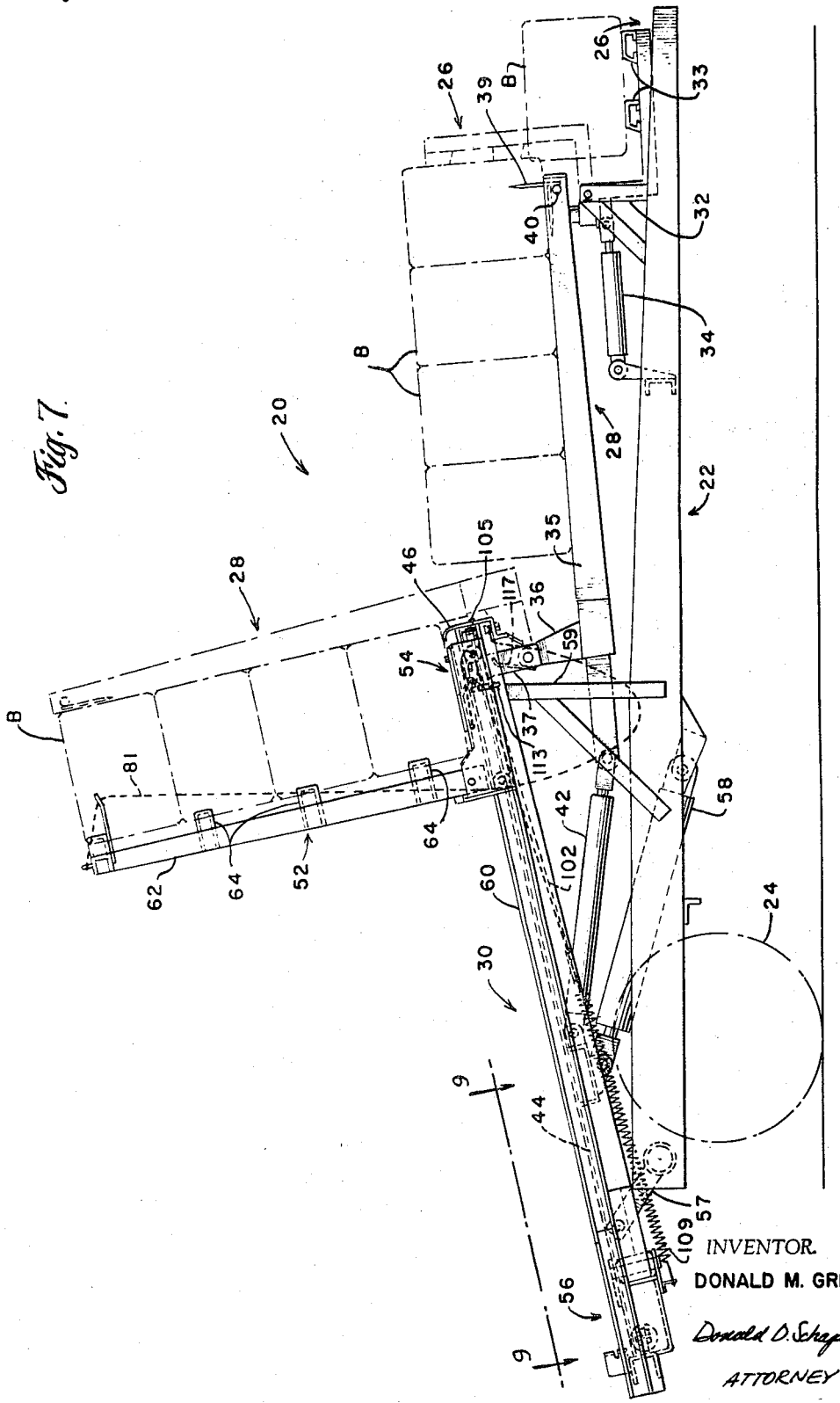
FIG. 7 is a side elevational view of the bale wagon with the tines in their "in" position for loading of the load-carrying bed and showing bales, indicated in dot-and-dash lines, on each of the wagon beds.

Referring now to the drawings by numerals of reference and particularly to FIG. 7, bale wagon 20 includes a chassis 22 comprising longitudinal frame members connected by suitable cross bars. The chassis 22 is supported adjacent its rear end by a pair of rear wheels 24, shown diagrammatically in FIG. 7. A receiving bed 26, a transfer bed 28, and a load-carrying bed 30 are arranged in tandem on chassis 22. The forward end of chassis 22 is adapted for connection to a tractor or other towing means, not shown. Bales are loaded and stacked on wagon 20 in substantially the same manner as shown and described in the U.S. patent to Grey previously referred to.

Receiving bed 26 comprises a pair of longitudinally extending pivotally mounted L-shaped elements 32 and a pair of transverse bars 33 fixed on elements 32. Hydraulic cylinder 34 provides a lifting means for receiving bed 26, and bed 26 is movable between the position shown in solid lines and the position shown in dot-and-dash lines in FIG. 7. A trip mechanism, not shown, on the receiving bed 26, serves to actuate cylinder 34 when two bales have been received and positioned on the receiving bed.

Transfer bed 28 comprises a flat plate 35, a pair of vertically extending mounting elements 36 which are pivotally connected to brackets 37 on load-carrying bed 30, and spike elements 39 carried by transverse rod 40 which is pivotal to move elements 39 from a horizontal position (dot-and-dash lines in FIG. 7) to a vertical position (shown in solid lines in FIG. 7). Receiving bed 28 is pivotally operable between the solid-line and dot-and-dash line positions shown in FIG. 7. A hydraulic cylinder 42 extending from load-carrying bed 30 serves as tilting means for the receiving bed 28. When eight bales have been accumulated on transfer bed 28, a tripping mechanism, not shown, actuates hydraulic cylinder 42 to raise the bed and deposit the bales in a tier on load-carrying bed 30.

Figure 8:
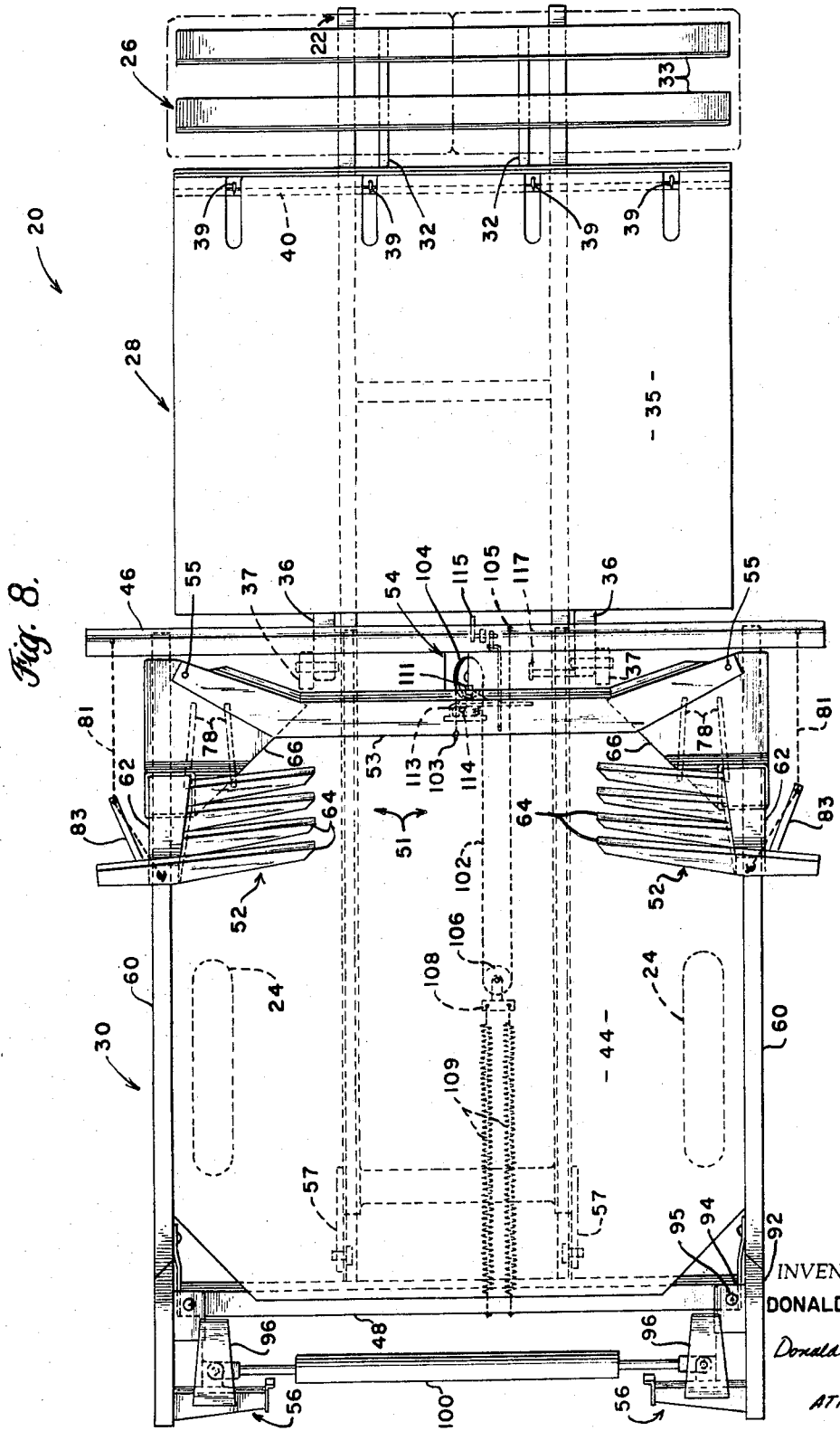
FIG. 8 is a plan view of FIG. 7.

Load-carrying bed 30, as shown in FIGS. 7 and 8, comprises a flat plate 44, a cross member 46 at its forward end, a cross member 48 at its rear end, longitudinally movable holding means 51, a latch mechanism 54 for securing holding means 51 in a desired position, and pivotally mounted carrier units 56 at the rear end of bed 30 for rotatably supporting tine arm units 52. Load-carrying bed 30 is pivotally mounted to brackets 57 on chassis 22, and a hydraulic cylinder 58 moves load-carrying bed 30 from a generally horizontal load-accumulating position to a substantially vertical unloading position. The forward end of bed 30 is supported on a stop 59.

Figure 10:
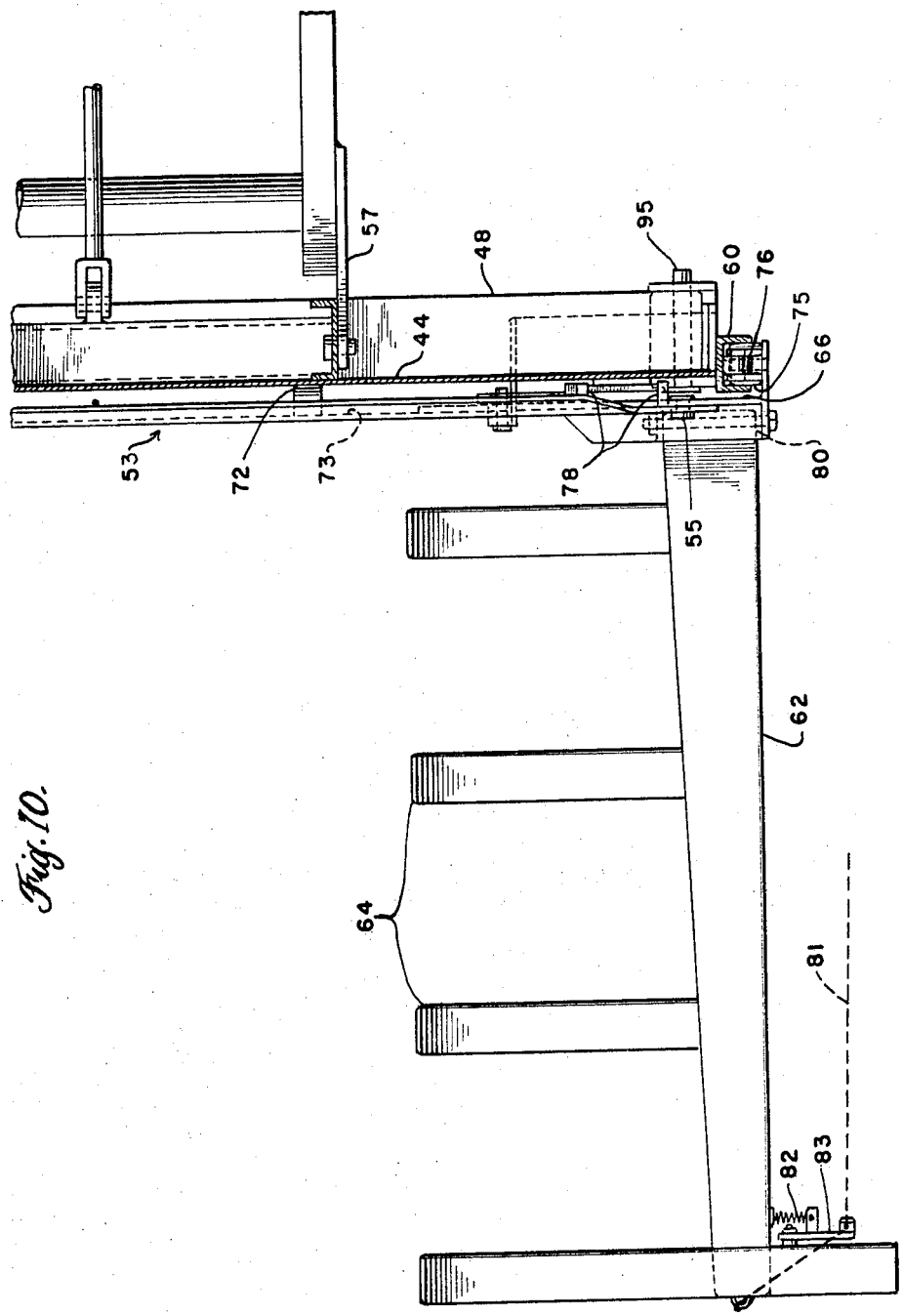
FIG. 10 is a fragmentary plan section taken along the line 10—10 of FIG. 1.

Holding means 51 comprises a pair of tine arm units 52 joined by a transversely extending link member 53. Tine arm units 52 are mounted on rails 60—60 attached to opposite sides of load-carrying bed 30, as shown in FIGS. 7 and 8. Each tine arm unit 52 comprises an arm 62 carrying spaced tines 64, and a triangular plate member 66 pivotally connected to link member 53 at 55. As shown in FIG. 10, member 53 is provided with bottom shoes 72 which are adapted to ride on plate 44 of receiving bed 30 during back and forth movement. An inclined surface 73 on member 53 permits the bales to slide over member 53 and into contact with the tines 64. Triangular plate members 66 are provided with guide rollers 75 and 76 operating in rails 60 on the load-carrying bed (see FIGS. 10 and 14). The bottom surfaces of plates 66 have guide bars 78 which cooperate with wedge members on carrier units 56, to be described below. Arms 62 are anchored in pockets 80 of plate members 66. Side chains 81 are provided to support tine arm units 52; chains 81 are anchored at one end to cross member 46 and at the other end to arms 83 which are biased into position by springs 82. Arms 83 hold the chains 81 clear of the sides of the bales.

Pivoted carrier units 56 are provided at the rear end of load-carrying bed 30, as best seen in FIGS. 8, 12, and 13, for rotatably supporting tine arm units 52 when a retrieving operation is being performed. Each carrier unit 56 comprises a main body portion 90, and channel members 92 adapted to align with rails 60, as shown in FIG. 12. Legs 94 having apertures for pivot pins 95 provide the means by which the carriers are rotatably mounted on the cross member 48 of the load-carrying bed 30. Wedge members 96 overlying body portion 90 are adapted to be received within bars 78 on triangular plate members 66; brackets 98 extending from channel members 92 and having lugs 99 thereon are for purposes hereinafter described.

Figure 9:
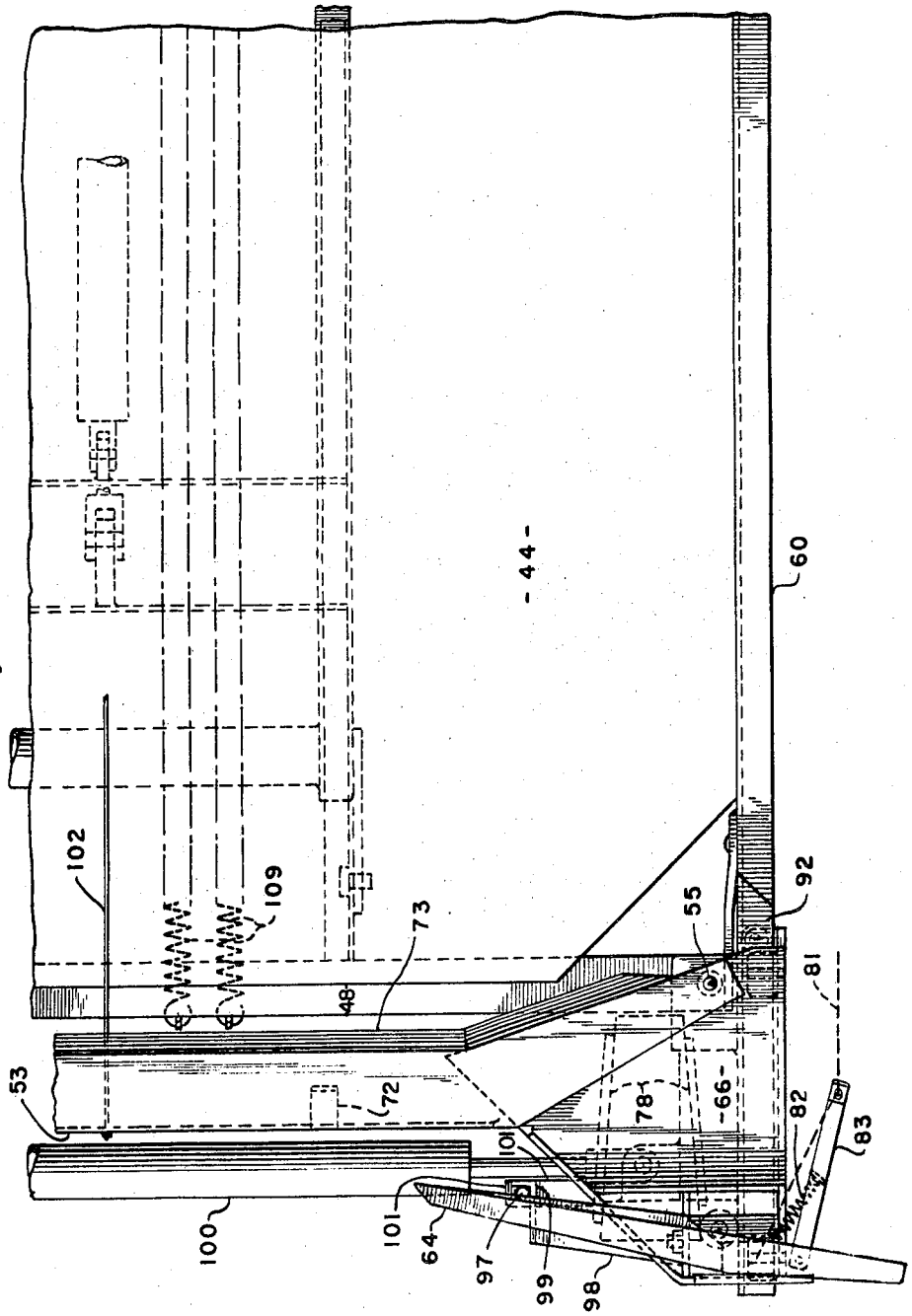
FIG. 9 is an enlarged fragmentary plan view taken as indicated by the line 9—9 of FIG. 7, but showing a tine arm unit in its rearmost position.
Figure 11:
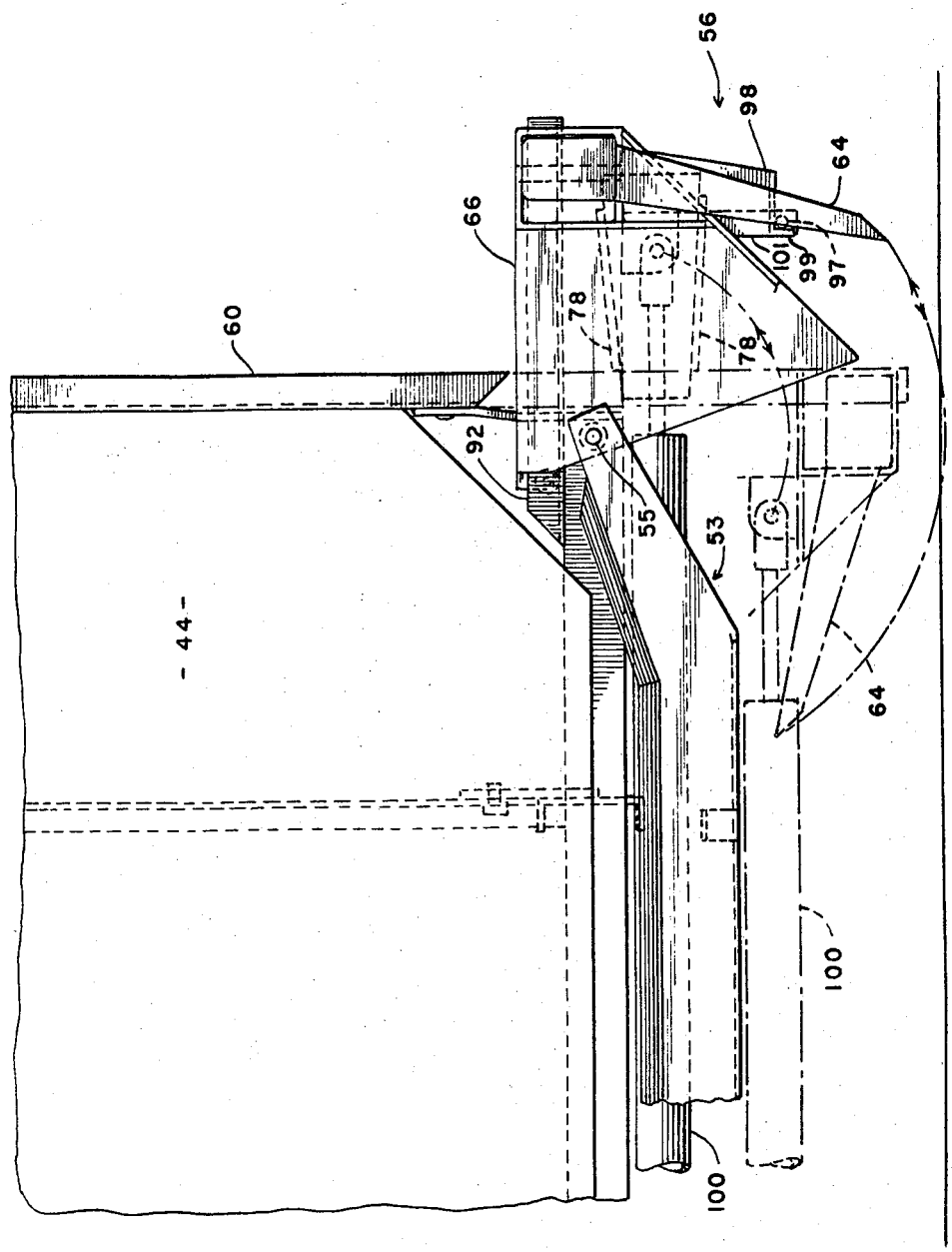
FIG. 11 is a fragmentary face view of the load-carrying bed in its upright position with the tine arm unit shown in full lines in its "out" position and in dot-and-dash lines in its "in" position.

Rotation of carriers 56 from the "in" position of FIGS. 9 and 12 to the "out" position of FIG. 11 is effected by means of a cylinder driven device 100 under valve control by the operator. In some instances, it is desirable to lock tine arm units 52 to carrier units 56; this is accomplished by passing a pin 97 through lug 101 on triangular plate member 66 and through lug 99 on bracket 98 of the carrier unit 56 (see FIGS. 9 and 12-14).

Latch means 54, shown in FIGS. 7 and 8, is provided to fixedly secure holding means 51 in a given position relative to load-carrying bed 30, and comprises a cable 102 anchored at 103 to link member 53 and passing around an inclined pulley 104, around a floating pulley 106, and then extending to cross member 46 of the receiving bed where it is anchored at 105. Floating pulley 106 is carried by a yoke 108 connected to two long springs 109–109 which are tensioned between yoke 108 and cross member 48 of the load-carrying bed. In FIGS. 7 and 8, it will be seen that the tension of the springs 109 has urged the tine arm unit 52 to the forward end of the load-carrying bed 30 where it is in position for bale loading.

In order to hold tine arm units 52 against displacement when the bale tiers are delivered to the load-carrying bed 30 and to prevent toppling of the bales, a one revolution latch is associated with pulley 104 comprising a stop-lug 111 on the pulley 104. A spring-loaded latch 113, pivoted at 114, is normally in contact with lug 111 to prevent rotation thereof. An actuator 115 can be used to manually release the latch when the wagon is to be used for bale stack retrieving, and a leaf spring 117 carried by transfer bed 28 momentarily releases the latch to allow one revolution of the pulley 104 each time a tier of bales is delivered to the load-carrying bed 30 by the transfer bed 28. The diameter of the pulley 104 is so calculated that its circumference equals the distance a bale tier will move before the lug 111 engages the latch to stop the movement of the tine arm units and the bales thereagainst.

Figures 3, 4:
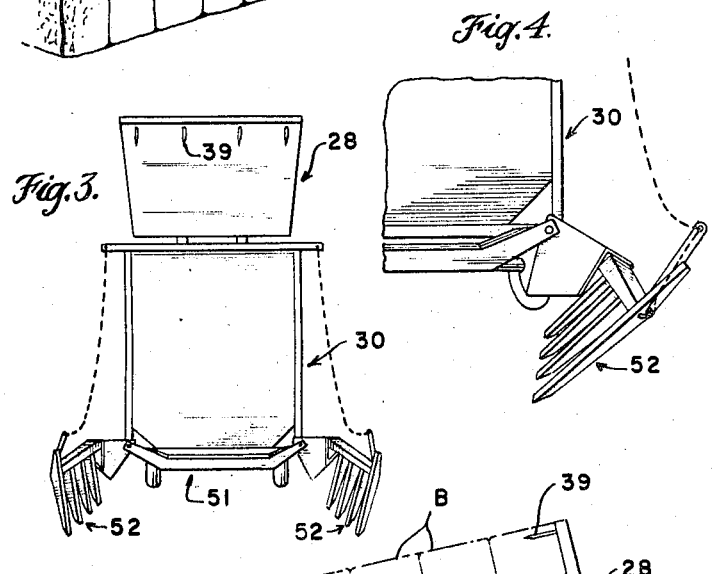
FIG. 3 is a perspective view looking directly in at the load-carrying bed in FIG. 1, but showing the tines rotated to their "out" position.
FIG. 4 is a somewhat enlarged perspective view looking directly in at the load-carrying bed, and showing the tines in a position intermediate of the "out" and the "in" positions.

Operation of the bale wagon is as follows:

With reference to FIGS. 7 and 8, bales B are loaded onto the receiving bed 26 one bale at a time. When two bales have been received on the receiving bed, as shown in FIGS. 7 and 8, a tripping mechanism (not shown) causes the hydraulic actuator 34 to pivot the receiving bed upwardly and deposit the bales on the transfer bed. When a layer of eight bales has been formed on transfer bed 28, the transfer bed is pivoted to a vertical position and the bales are placed in a tier on load-carrying bed 30. Each time a tier of bales is placed on the load-carrying bed, the tine arm units move rearwardly one bale width. When the load-carrying bed has been filled, the bale wagon is driven or towed to the desired location for unloading. To unload the bale wagon, the load-carrying bed is pivoted to a vertical position by hydraulic actuator 58. With the load-carrying bed in a vertical position, hydraulic cylinder 100 is actuated to pivot the carrier units 56 with tine arm units 52 thereon to their "out" position, as shown in FIG. 3. The wagon can then be moved away from the stack.

Figure 1:
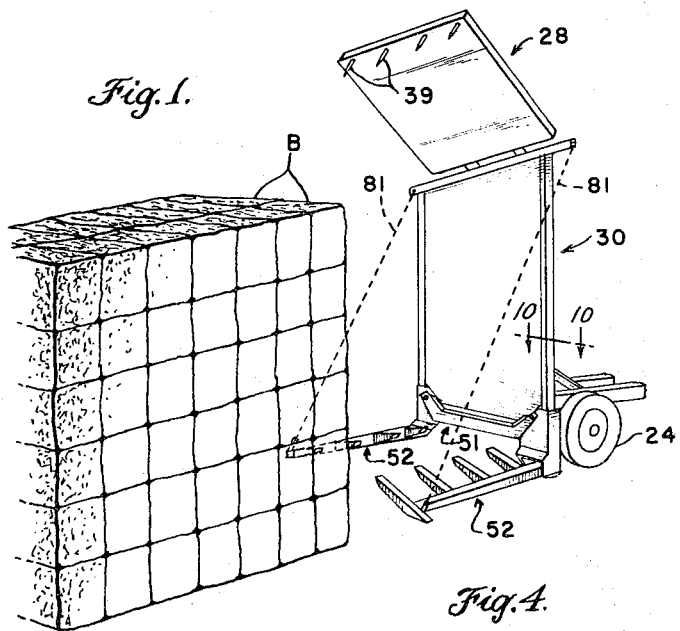
FIG. 1 is a perspective view showing the wagon adjacent a stack of bales, prior to being moved into position to retrieve bales.
Figure 2:
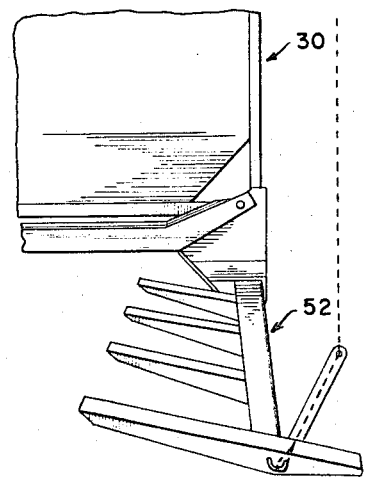
FIG. 2 is a perspective view, somewhat enlarged, looking directly in at the load-carrying bed and showing the tines in the same position as shown in FIG. 1.

When it is desired to move a wagon load of bales from the field stack (see FIGS. 1-6), the bale wagon is moved into close proximity to the stack and the operator actuates a suitable valve controller to swing the load-carrying bed 30 to a vertical or upright position. As the load-carrying bed 30 pivots to its upright position, the tine arm units 52, because of their weight, roll down from the position of FIG. 7 to the position of FIG. 1. In this movement, the weight of the tine arm units overcomes the tension of springs 109—109. The operator then actuates another valve controller to rotate the tine arm units in their "out" position, as shown in FIG. 3. With the tine arm units in their "out" position, the wagon is backed against a stack of bales; the tine arms are spaced sufficiently outward to clear the stack (see FIG. 3). It will also be noted that spikes 39 have been manually rotated to a position perpendicular to the receiving bed so that they will be in a position to grip the bales when the transfer bed is brought down on top of the bale stack.

Figure 5:
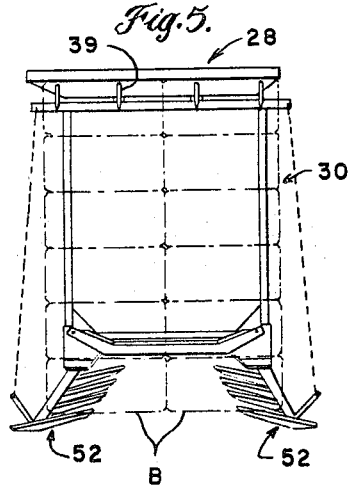
FIG. 5 is a perspective view showing the tines rotated to their "in" position with the tines under the bale stack (indicated in dot-and-dash lines), the bale stack having been raised somewhat above the ground level by the tines.
Figure 6:
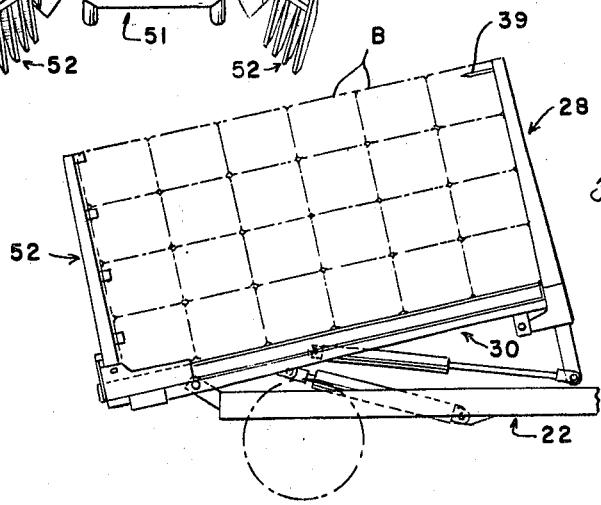
FIG. 6 is a side elevational view showing the bale wagon load-carrying bed in transport position with a retrieved stack of bales thereon.

With the bale wagon load-carrying bed firmly against the end of the bale stack, the tine arm actuator 100 rotates the tine arms inwardly, as shown in FIG. 5, so that the tines scoop under the stack of bales and raise it somewhat above the ground level. Also, the transfer bed controller 42 has been activated to swing the transfer bed down to clamp the stack firmly between it and the tine arm units 52. With the stack of bales thus clamped, the load-carrying bed is returned to its horizontal position (see FIG. 6) and the wagon is ready for trasport.

It will be seen from the foregoing description that the disclosed bale wagon will perform all of the work in a field operation previously requiring two special purpose vehicles. Further, a novel holding means on the load-carrying bed greatly simlifies the unloading mechanism of the wagon and eliminates the need for push shoes or other similar devices.

Having thus described my invention, what I claim is:

1. A bale wagon comprising: a chassis structure; bed means on said chassis structure; means on said wagon for forming vertical tiers of bales on said bed means; means for moving said tiers of bales rearwardly on said bed means; holding means mounted on said bed means, said holding means being selectively movable between a first position in operative engagement with said bales and a second position out of operative engagement with said bales, said holding means when in said first position serving to prevent rearward movement of said bales relative to said bed means, said holding means extending transversely of said bed means when in said first position, and being movable from a forward portion of said bed means to a rearward end, and said holding means being pivotal at said rearward end from said first position to said second position after said bed means is moved from a load-carrying position to a vertical position.

2. A bale wagon, as recited in claim 1, wherein said bed means comprises a receiving bed, transfer bed, and a load-carrying bed; said means for forming vertical tiers of bales comprises lifting means for delivering rows of bales from said receiving bed to said transfer bed to form a layer of bales thereon, and tilting means for delivering layers of said bales to said load-carrying bed to form vertical tiers of bales thereon; and said holding means is mounted on said load-carrying bed.

3. A bale wagon, as recited in claim 2 wherein track means are mounted on opposite sides of said load-carrying bed; said holding means is slidably mounted on said track means; and carrier means are pivotally mounted at the rear end of said load-carrying bed.

4. A bale wagon, as recited in claim 3, wherein said holding means is receivable on said carrier means for pivotal movement therewith.

5. A bale wagon, as recited in claim 4, wherein said holding means comprises a pair of tine arm units spaced on opposite sides of said load-carrying bed, and a link element extending between and pivotally connected to each of said tine arm units.

6. A bale wagon, as recited in claim 5, wherein each of said tine arm units comprises a plate member pivotally connected to said link element, an arm extends generally perpendicular to said plate member and a plurality of tines are spaced along said arm.

7. A bale wagon, as recited in claim 3, wherein said carrier means comprises a pair of carrier units pivotally mounted on opposite sides of said load-carrying bed and actuating means extending betwen and connected to each of said carrier units for pivotally moving said carrier units.

8. A bale wagon, as recited in claim 7, wherein each of said carrier units comprises a channel member adapted to register with said track means, a body portion having a leg thereon pivotally connected to said load-carrying bed, a wedge member overlying said body portion, and a bracket extending from said channel member.

9. A bale wagon, as recited in claim 4, wherein means is provided to lock said holding means on said carrier means.

10. A bale wagon, comprising:
 (a) means for receiving bales on the wagon and for forming them into a plurality of vertical tiers of bales;
 (b) means for moving said tiers longitudinally rearward on said wagon;
 (c) holding means mounted for longitudinal rearward movement on said wagon;
 (d) combined means for depositing upon and retrieving from the ground said plurality of vertical tiers of bales in one composite bale stack;
 (e) certain of said means for forming the vertical tiers constituting both part of the holding means for holding the bales during unloading, and part of the retrieving means.

11. A bale wagon as recited in claim 10, wherein said means for depositing the bales on the ground comprises a load-carrying bed pivotally mounted on a chassis and means for tilting the bed in a fore-and-aft direction to a vertical position at one end of said wagon, said means for retrieving said stack of bales from the ground comprises holding means for laterally gripping said stack of bales near the ground.

12. A bale wagon, comprising: means for receiving bales on the wagon and forming them into a plurality of vertical tiers of bales; means for depositing said plurality of bales on the ground in one composite bale stack; and means for picking up said stack of bales from the ground comprising a load-carrying bed pivotally mounted at one longitudinal end on a chassis structure and a transfer bed pivotally mounted on said load-carrying bed and selectively engageable with the top of the bale stack.

References Cited

UNITED STATES PATENTS

| | | | |
|---|---|---|---|
| 2,413,979 | 1/1947 | Lamb | 214—6 X |
| 2,745,562 | 5/1956 | Vandemark et al. | 214—77 |
| 2,828,031 | 3/1958 | Babcock et al. | |
| 2,848,127 | 8/1958 | Grey | 214—6 X |
| 3,223,267 | 12/1965 | Stammen | 214—730 |
| 3,261,482 | 7/1966 | Tate | 214—6 |

GERALD M. FORLENZA, *Primary Examiner.*

R. J. SPAR, *Assistant Examiner.*